J. A. STACY & J. W. CARROLL.
AUTOMATIC AIR VALVE FOR WATER-PIPES.
No. 178,253. Patented June 6, 1876.
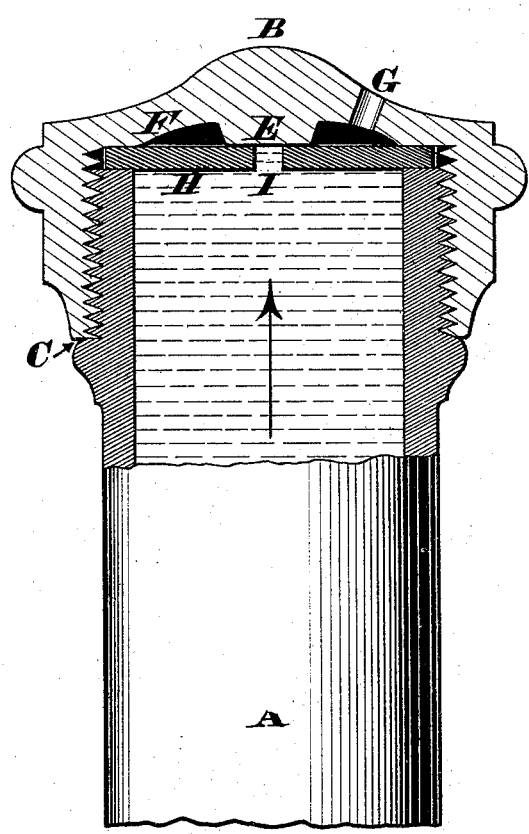
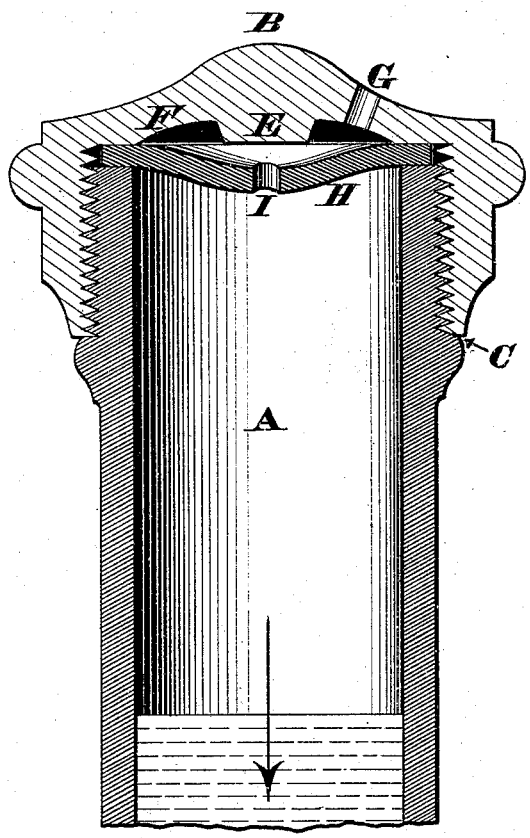
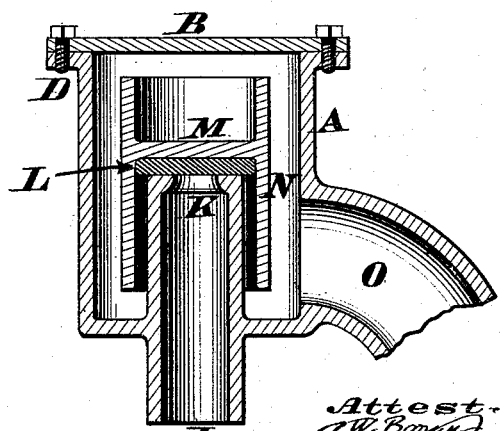
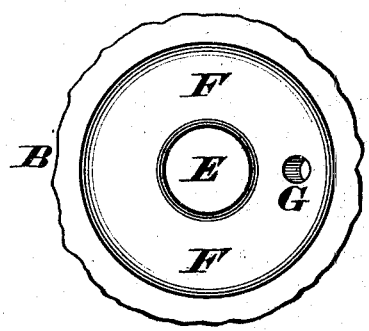

UNITED STATES PATENT OFFICE.

JOHN A. STACY AND JOHN W. CARROLL, OF CINCINNATI, OHIO.

IMPROVEMENT IN AUTOMATIC AIR-VALVES FOR WATER-PIPES.

Specification forming part of Letters Patent No. 178,253, dated June 6, 1876; application filed March 27, 1876.

*To all whom it may concern:*

Be it known that we, JOHN A. STACY and JOHN W. CARROLL, both of Cincinnati, Hamilton county, Ohio, have invented a new and useful Automatic Drain - Valve for Water-Pipes, of which the following is a specification:

The object of this invention is to secure a prompt automatic draining of water-pipes the moment the stop-valve is closed and its wasteway opened, the improvement being designed more especially for application to pipes that are carried up through several stories of a building.

The usual method of emptying these pipes is to turn off the water at the stop and waste, and then open the upper valve or cock of the pipe, thereby admitting air into the latter, and compelling the water to escape through the wasteway into the ground. But it frequently happens that this precaution of opening the upper cock is neglected, and consequently the pipe freezes up and bursts, and either floods the building or causes other serious damages. With our drain - valve such a contingency cannot occur, as said valve will automatically open and admit air to the pipe the moment the stop and waste valve is shut, as hereinafter more fully explained.

In the accompanying drawing, Figure 1 is a vertical section through our automatic drain-valve, the diaphragm being represented as closed by the pressure of water in the pipe. Fig. 2 is a similar section, but showing said diaphragm sprung so as to admit air into the pipe and secure the drainage of the same. Fig. 3 is a plan of the under side of the detachable cap, and Fig. 4 is an axial section of a modification of our invention.

A represents a box, or tube, or chamber of any suitable shape or size, and capable of being attached directly to the upper end of a water-pipe with solder or otherwise; or, if preferred, said box or tube may be secured to a branch or bend communicating with the pipe. This box is open at both ends, and is covered with a detachable cap, B, secured in position either with a screw-thread, C, as shown in Figs. 1 and 2, or with bolts or screws, as represented in Fig. 4. The under side of this cap may be perfectly flat; but the preferred way is to construct it with a central and depending boss, or lug, or stump, E, surrounded with an annular recess or pit, F. Furthermore, said cap is pierced with an aperture or slot, G, for a purpose that will presently appear. Resting upon upper end of tube A, and securely clamped thereto by cap B, is a disk-diaphragm, H, composed of leather or india-rubber, or any other durable and pliable material. This flexible diaphragm is pierced with a central aperture, I, of somewhat less diameter than boss E.

The operation of the device is as follows: Immediately upon opening the stop and waste valve at the bottom of the pipe to which tube A is secured, water rushes up, as indicated by arrow in Fig. 1, and forces the central portion of diaphragm H tightly against stump E, thereby effectually preventing the leakage of water through either of the apertures I or G. As long as the pressure is exerted in tube A the diaphragm will remain in this closed condition, and will prevent the escape of water from said tube, and also exclude air therefrom; but the moment the stop-valve is closed and its wasteway opened, so as to relieve the tube A of the pressure of water, the diaphragm H instantly springs or bends by the action of the atmosphere on the upper surface of said disk H. The diaphragm being thus depressed at its center and sprung away from the seat E, it is apparent that air will now enter through apertures G and I, and compel the water to escape from pipe A, as indicated by arrow in Fig. 2.

From the above description it will be understood that our device requires no attention whatever, but acts automatically, and, therefore, no neglect on the part of the inmates of the house can cause the pipe to freeze up, provided they take the usual precaution to close the stop and waste valve.

It is evident a precisely similar result can be accomplished by reversing the action of the apparatus, so as to cause the pressure of water to force a diaphragm or valve down on a seat, as seen in Fig. 4. In this illustration the chamber A is shown as having a stand-pipe, J, open at both ends, and provided with a seat, K, for valve L, which latter is attached to the under side of partition M of cage N.

This cage is adapted to have a free vertical movement on said stand-pipe, which pipe need not project below the box A. O is the inlet that admits water to this box. The pressure of water within chamber A maintains the valve L securely upon its seat K, and thereby prevents leakage through pipe J; but as soon as the stop and waste valve is closed, the atmospheric pressure elevates the cage L M N, and thereby insures the drainage of inlet O and its connections.

As previously stated, the under side of cap B may be perfectly flat; but by chambering it out, as at F, an extended area is afforded on the upper side of disk H for the air to act upon, besides which, this chamber prevents said diaphragm adhering to the cap after being in contact with the latter for some length of time.

We are aware that it is not new to apply an automatically-opening valve to water-pipes for the purpose of draining the latter, as such a device is seen in Letters Patent No. 169,694, issued November 9, 1875, to S. T. Harker, which patent shows a puppet or spindle valve arranged so as to drop bodily the moment the water-pressure is reduced.

We are also aware that it is not new to apply a flexible or yielding diaphragm to a self-acting air-vent, as such a diaphragm is seen in Letters Patent No. 148,539, issued March 10, 1874, to A. C. Woolley.

Our claim, therefore, is limited to the combination of such a diaphragm with a stump and an annular recess in the cap of the box, which stump serves as a seat for the central and perforated portion of the diaphragm to close against, while the annular recess exposes a lage area on the top of said diaphragm for the air to act on, thereby insuring the utmost promptness of operation the moment the stop and waste cock is opened.

We claim as our invention—

In combination with box or tube A, removable perforated cap B G, and centrally-pierced yielding diaphragm H I, supported at its margin and seating against stump E, the annular recess F, communicating with aperture G of the cap, for the purpose of exposing a large area on the top of diaphragm H for the air to act on, substantially as herein described and set forth.

In testimony of which invention we hereunto set our hands.

JOHN A. STACY.
JOHN W. CARROLL.

Witnesses:
 JAMES H. LAYMAN,
 J. B. CONKLIN.